Feb. 29, 1944.  C. T. DARE ET AL  2,342,792
TURNING MACHINE
Filed Oct. 31, 1940  5 Sheets-Sheet 2

Fig. 2.

Inventors
Curtis T. Dare
Gordon F. Esson
BY
Parker, Carlson, Pitzner + Hubbard
Attorneys.

Feb. 29, 1944.    C. T. DARE ET AL    2,342,792
TURNING MACHINE
Filed Oct. 31, 1940    5 Sheets-Sheet 5

Inventors
Curtis T. Dare
Gordon F. Esson
BY
Parker, Carlson, Pitzner & Hubbard
Attorneys.

Patented Feb. 29, 1944

2,342,792

UNITED STATES PATENT OFFICE 2,342,792

TURNING MACHINE

Curtis T. Dare and Gordon F. Esson, Detroit, Mich., assignors to Ex-Cell-O Corporation, Detroit, Mich., a corporation of Michigan Application October 31, 1940, Serial No. 363,718

13 Claims. (Cl. 82—14)

The present invention relates to improvements in metal turning machines, and has particular reference to a new and improved machine of this character adapted especially for the turning of shells of high explosive projectiles.

One of the objects of the invention is to provide a novel turning machine employing a plurality of cutting tools independently pattern controlled for operating simultaneously on a workpiece.

Another object is to provide a novel shell turning machine which has a relatively high rate of production.

A more specific object is to provide a metal turning machine having a novel tool support in which a plurality of tool slides are independently controlled by a cam or template to provide rapid approach at the start of the cutting stroke and rapid retraction at the end of the return stroke and to cause the tools to impart a predetermined contour to the work in the course of the cutting stroke.

A further object is to provide such a tool support in which the tool slides are automatically adjusted relative to the control cam at the end of each return stroke to project the tools for engagement with the work in the succeeding cutting stroke, and at the end of each cutting stroke to withdraw the tools for clearance from the work during the succeeding return stroke.

Still another object of the invention is to provide a new and improved shell turning machine having means for supporting and rotating the work blank, a tool support with a plurality of spaced cutting tools arranged at one side of the machine to turn the periphery of the work to a predetermined contour, and a second tool support with a plurality of spaced cutting tools arranged at the other side of the machine to turn radial or end faces on the work.

Other objects and advantages will become apparent as the description proceeds.

In the accompanying drawings.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Figure 1:
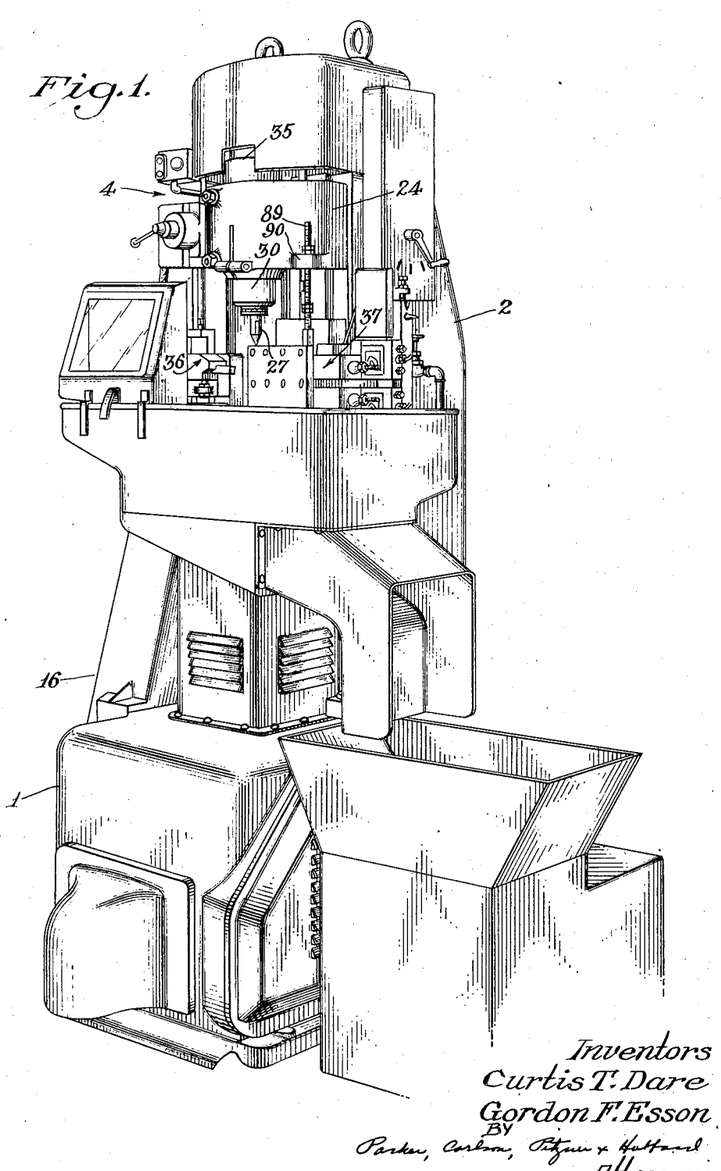
Figure 1 is a perspective view of a turning machine embodying the features of our invention.
Figure 2:
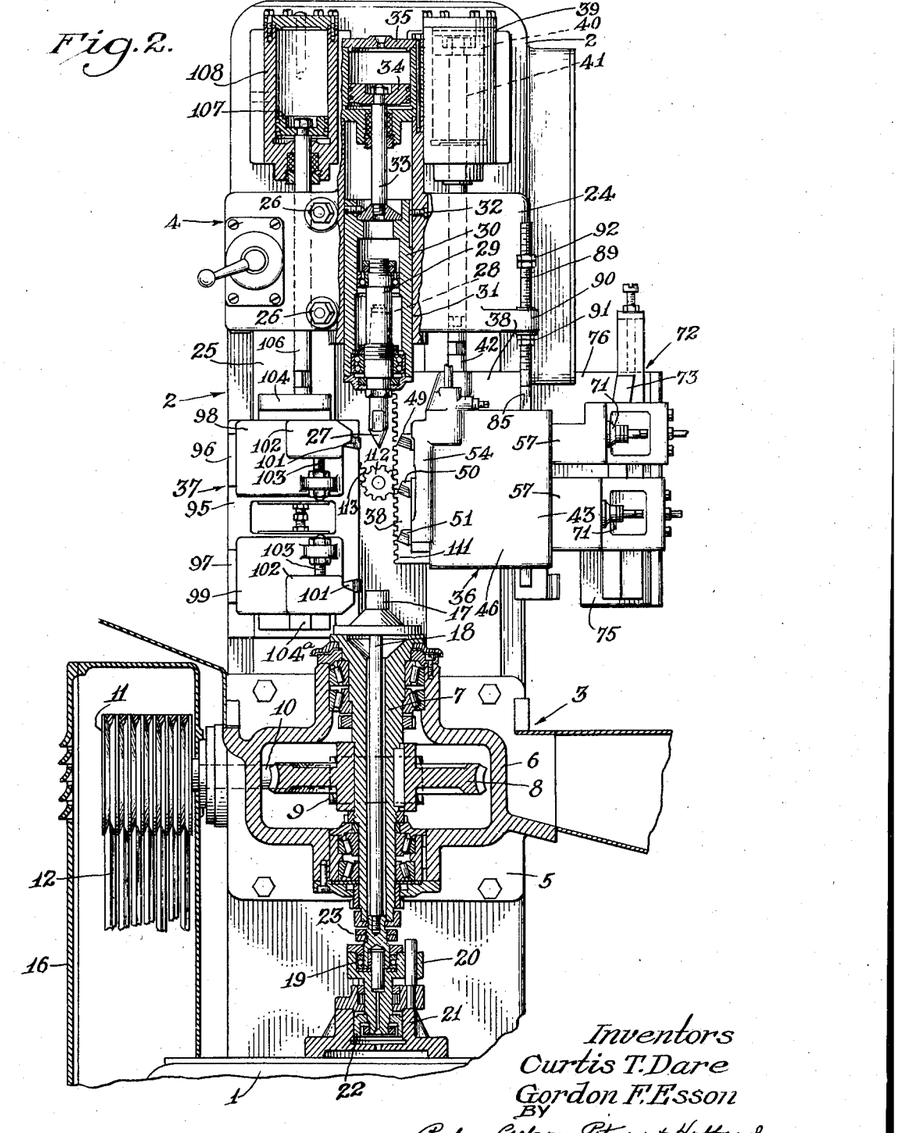
Fig. 2 is a fragmentary vertical section of the machine.

Referring more particularly to the drawings, the shell turning machine constituting the exemplary embodiment of the present invention is of the vertical type. It comprises a hollow base 1 adapted to rest on a suitable foundation, and a vertical column 2 superimposed on the rear portion of the base. Mounted on the front of the column 2 are a driving spindle head 3 and a tailstock 4 which are adapted to coact with opposite ends of the workpiece to support the latter for rotary drive while disposed in a vertical position. In the present instance, the workpiece is shown as the casing or shell of a large caliber explosive projectile.

The spindle head 3 comprises a bracket 5 bolted to the front of the column 2 just over the front portion of the base 1 and formed with a housing 6. A tubular drive spindle 7 extends vertically through the housing 6 and is suitably journaled in opposite ends thereof. Fixed on the spindle 7 intermediate its ends and within the housing 6 is a worm wheel 8. This wheel meshes with a worm 9 fixed on a shaft 10 journaled in the rear of the housing 6. One end of the shaft 10 projects from the housing 6 and has secured thereto a multiple groove pulley 11. This pulley is adapted to be connected through a plurality of V-belts 12 to a suitable power drive (not shown). The pulley 11 and the belts 12 may be suitably enclosed within a guard 16 on the side of the machine.

Attached to the upper end of the spindle 7 is a suitable driver 17 adapted to support the workpiece in centered position and to rotate the latter at a suitable peripheral cutting speed. The driver 17 may be of any suitable character, such for example as of the expanding type for engaging the interior of the workpiece, and is not specifically disclosed herein since per se it forms no part of the present invention. An actuating rod 18 for the driver 17 extends vertically through the spindle 7 and is rotatable therewith. The lower end of the actuating rod 18 is suitably journaled through an end thrust ball bearing 19 in a nonrotatable bearing bracket 20. A hydraulic actuator is provided for lowering and elevating the bracket 20 and therewith the rod 18 to cause the driver 17 to engage and release the workpiece. In the present instance, the hydraulic actuator comprises a cylinder 21 mounted on the top of the base 1, and adapted to be connected reversibly at opposite ends to a suitable source of fluid under pressure (not shown). Slidable in the cylinder 21 is a piston 22 which is connected to a piston rod 23 extending axially through the upper end of the cylinder 21 in axial alinement with the rod 18, and preferably formed integral with the bearing bracket 20. It will be understood that when fluid under pressure is supplied to the upper face of the piston 22, the rod 18 will be shifted in a downward direction to expand the driver 17 into centered driving engagement with the lower end of the workpiece. Upon supplying fluid under pressure to the lower face of the piston 22, the rod 18 will be shifted upwardly to disengage the driver 17 and the workpiece.

The tailstock 4 comprises a housing 24 which is mounted for adjustment on parallel vertical dove-tail guideways 25 formed on the front of column 2. Suitable clamp nuts 26 are provided for rigidly securing the tailstock housing 24 to the guideways 25 in selected position of adjustment, this position being determined by the requirements of the workpiece.

The tailstock 4 comprises a conventional center 27 in vertical axial alinement with the driver 17 and adapted to center and support the upper end of the workpiece. In the present instance, the center is of the rotary type and is hydraulically shiftable into and out of engagement with the workpiece. To this end, the center 27 is removably inserted in a taper socket 28 formed in the lower end of a vertical center shaft 29. The latter is suitably journaled at opposite ends in a cylindrical ram 30 which is slidable for vertical adjustment in a bore 31 formed in the tailstock housing 24 between the guides 25. A spline pin 32 constrains the ram against rotation while permitting axial adjustment. Rigidly connected to the upper end of the ram 30 is a piston rod 33. A piston 34 is connected to the rod 33 and is slidably disposed in a cylinder 35 mounted on the tailstock housing 24. The piston 34 and cylinder 35 constitute a hydraulic actuator adapted to be reversibly connected to a suitable source of fluid under pressure (not shown). It will be understood that in loading the workpiece into the machine, the lower end is properly positioned on the driver 17, and then the center 27 is actuated into engagement with the upper end. Thereafter, the rod 18 is actuated to establish rotary driving engagement between the spindle 7 and the workpiece.

Figure 3:
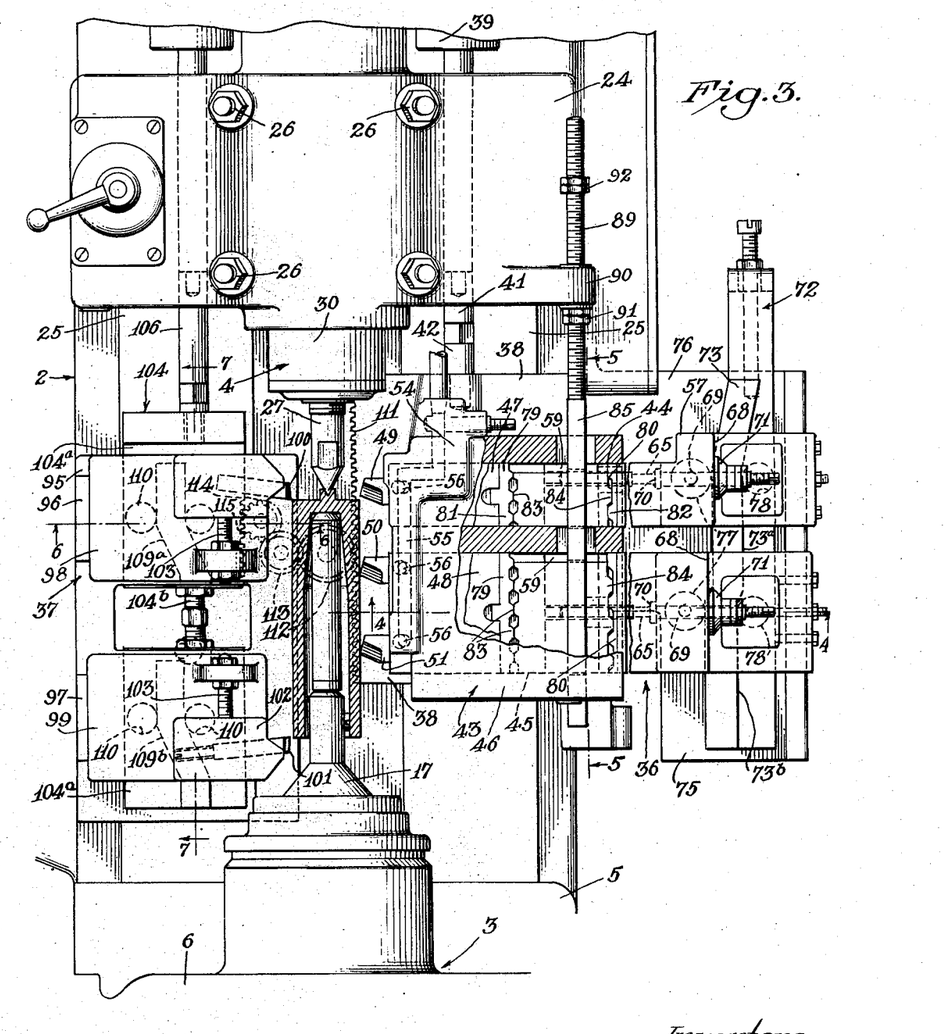
Fig. 3 is an enlarged fragmentary front view, partially in section of the tool supporting and actuating means.

Two toolheads 36 and 37, each carrying a plurality of cutting tools, are mounted on the front of the column 2 for operative association with the workpiece at opposite sides thereof. These toolheads may be similar or different in construction depending on the nature of the work which the tools are to perform.

The toolhead 36, in the form illustrated, is suitably guided on the front of the column 2, for example, on the lower end portion of the associated dove-tail guideway 25, for translation longitudinally of the workpiece in a cycle comprising a downward cutting stroke and a free return stroke. More particularly, the toolhead 36 comprises a base slide 38 mounted for vertical translation on the associated guideway 25 by a hydraulic actuator. This actuator comprises a cylinder 39 rigidly supported on the front of the column 2 adjacent the upper end. A piston 40 is slidably disposed in the cylinder 39 and is connected to a piston rod 41 extending downwardly through the tailstock housing 24. The lower end of the piston rod 41 is connected through a removable rod extension 42 to the base slide 38 of the tool head 36. It will be understood that rod extensions 42 of different lengths may be substituted as required to locate the tool head 36 in its proper initial or starting position as determined by the particular workpiece to be machined. A suitable source of fluid under pressure (not shown) is adapted to be connected alternately to opposite ends of the cylinder 39 so as to effect reciprocation of the piston 40.

Figure 4:
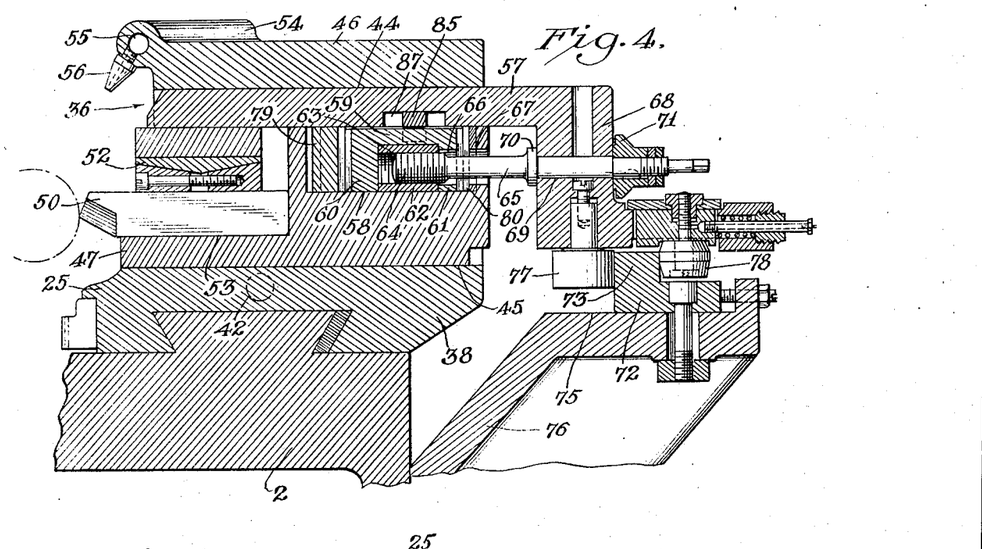
Fig. 4 is a horizontal sectional view through one of the tool supports taken substantially along line 4—4 of Fig. 3.
Figure 5:
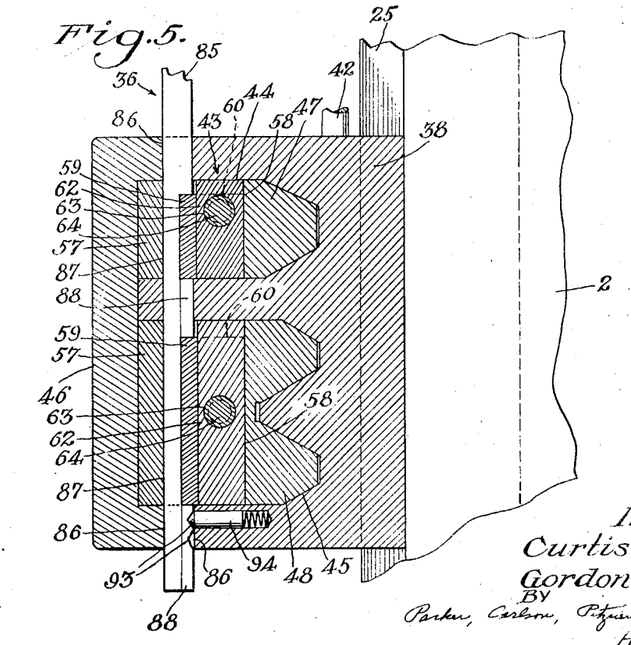
Fig. 5 is a vertical sectional view taken substantially along the line 5—5 of Fig. 3.

The front of the base slide 38 is formed with a generally rectangular guide structure 43 provided with a plurality of parallel vertically-spaced transverse guideways. In the present instance, two guideways 44 and 45 are shown, but it is to be understood that any desired number may be provided. Each of the guideways has parallel sides opening to the front of the structure 43 and is tapered toward the bottom. A cover plate 46 is bolted to the front of the guide structure 43, and serves to close the guideways 44 and 45 except at the ends.

Seated in the bottom of the guideways 44 and 45 for independent adjustment transversely of the base slide 38 are a like number of complementally shaped tool slides 47 and 48. A suitable number of tools are removably mounted in the forward ends of the slides 47 and 48 for cutting engagement with the workpiece at spaced vertical points along the latter. More particularly, either or both of the slides 47 and 48 may be provided with one or more tools of the desired type. In the present instance, the slide 47 carries one tool 49, and the slide 48 carries two tools 50 and 51, these tools being of a form adapted for turning peripheral work surfaces. Each of the tools may be secured in position in a conventional manner, as for example by means of a double wedge clamp 52 adjustable to confine the tool shank tightly within a slot or recess 53 in the forward end of the tool slide. Integral with the cover plate 46 is a bracket 54 which is formed with a flow passage 55 adapted to be connected to a source of coolant (not shown), and having a plurality of outlet nipples 56 discharging respectively to the cutting tips of the tools 49, 50 and 51.

Each of the tool slides 47 and 48 is associated in assembled relationship with an actuating slide 57 within the associated guideway. These two assemblies are similarly constructed and actuated so that a description of one will suffice for both, the corresponding parts of the other assembly being identified by the same reference numerals.

The tool slide 47 and the associated actuating slide 57 are interconnected for joint operation and for relative longitudinal adjustment. To this end, the tool slide 47 is formed in the top with a transverse rectangular notch 58 of substantial width. A cam block 59 is adjustably positioned within the notch 58, but is positively interlocked in all positions of adjustment with the slide 47. In the present instance, the block 59 is substantially channel-shaped, having spaced depending legs 60 and 61 slidably engaging the bottom of the notch 58. A rectangular nut 62 is slidably fitted within the block 59 between the legs 60 and 61 and has a threaded bore 63 extending longitudinally of the slide 47. An adjusting screw 64 is in threaded engagement with the bore 63 and has a shaft 65 which extends from the nut 62 through an elongated slot or recess 66 in the leg 61 and through a bore 67 in the outer end of the tool slide 47. The actuating slide 57 is adjustably superimposed on the tool slide 47 for sliding adjustment within the guideway 44 beneath the cover plate 46. The outer end of the actuating slide 57 projects from the guideway 44, and is formed with a depending right-angled body or bracket 68 extending in spaced relation across the contiguous outer end of the tool slide 47. To establish a connection between the slides, the outer end of the screw shaft 65 is rotatably anchored in the bracket 68. More particularly, the shaft 65 extends through a bore 69 in the bracket, and has a shoulder 70 engaging the inner face thereof. A micrometer dial 71 is rigidly keyed to the shaft 65 and engages the outer face of the bracket 68 so as to confine the shaft rotatably in a relatively fixed axial position. The very end of the shaft 65 is suitably squared for engagement by a hand tool whereby to effect relative adjustment of the tool slide 47 and its actuating slide 57.

Longitudinal movement of the tool slides 47 and 48 is independently controlled in accordance with the requirements of the workpiece by means of a cam or template 72 of predetermined shape. For example, this template may be shaped to impart a quick approach movement to the tools at the start of the cutting stroke and a quick return movement at the end of the free return stroke and also to generate the desired form on the workpiece during the course of the cutting stroke. The template 72 may comprise an elongated vertical plate having a guide flange 73 along one edge. This plate is bolted against a flat mounting surface 75 on a bracket 76 secured to the side of the column 2, but is laterally and longitudinally adjustable thereon to facilitate correlation of the template shape and position to the desired cutting path of the tools 49, 50 and 51. Different templates may be substituted for different work requirements.

The guide flange 73 of the template is operatively associated with the actuating slides 57 to move the tool slides 47 and 48 in the path determined by the configuration of the template. The means for this purpose comprise a roller 77 secured to the end of the bracket 68 for rolling engagement with one side of the guide flange 73 as the toolhead 36 is lowered and elevated. A second roller 78 is adjustably mounted on the bracket 68 for rolling engagement with the opposite side of the guide flange 73. The rollers or followers 77 and 78, therefore, serve to maintain the associated actuating slide 57 in definite relation to the flange 73.

The tools 49, 50 and 51 are arranged in the present illustration to turn contiguous portions of the workpiece along its length to a cylindrical form, and the two actuating slides 57 are accordingly arranged to coact with contiguous portions of the template. Thus, the guide flange 73 of the template has a part 73ª coacting with the followers 77 and 78 for the tool slide 47 and a part 73ᵇ coacting with the corresponding followers for the tool slide 78. Each of these parts is initially inclined to effect the rapid approach of the associated tool into cutting position at the start of the cutting stroke and to quickly retract the tool at the end of the return stroke, and then is straight to cause the associated tool to generate its portion of the cylindrical surface on the workpiece. The extent of movement of the toolhead 36 is slightly more than the spacing between the tools so that the cutting range of the tools will slightly overlap to insure turning of the full peripheral surface on the workpiece.

Provision is also made for effecting a slight retraction of the tool slides 47 and 48 independently of the actuating slides 57 at the end of the cutting stroke to obtain tool clearance from the work during the return stroke. This is accomplished by inserting two hardened wear plates 79 and 80 in position respectively against the opposite sides of each notch 58. These wear plates are removably keyed in position and are formed respectively with longitudinal series of cam ribs or serrations 81 and 82 adapted for coacting engagement with complementary serrations 83 and 84 in opposite sides of the associated cam block 59. The serrations are separated by flat root areas and are formed with flat top areas. The serrations 81 and 83 are staggered in relation to the serrations 82 and 84, and preferably are narrower and more in number than the opposite serrations 82 and 84. By reason of the staggered relationship, downward movement of the cam block 59 at the end of the return stroke of the tools will cause the serrations 83 to ride onto the flat ends of the serrations 81 and simultaneously cause the serrations 84 to move off of the serrations 82, thereby projecting the tools into their normal position. Upward movement of the cam block 59 at the end of the feeding stroke will cause the serrations 84 to ride onto the flat ends of the serrations 82 and simultaneously cause the serrations 83 to move off the serrations 81 thereby retracting the tools into their clearance position.

The cam blocks 59 for the two slides 47 and 48 are actuated jointly in timed relation to the movement of the base slide 46 by means of a shifter bar 85 extending vertically through the guide structure or housing 43. More particularly, the bar 85 is guided in alined grooves 86 opening through the intermediate and side walls of the structure 43. The bar also extends slidably through transverse grooves 87 formed in the undersides of the actuating slides 57, and is thereby confined in position. The grooves 87 are substantially wider than the bar 85 so as to permit relative longitudinal movement of the slides 57. The cam blocks 59 interfit with the underside of the bar 85 in such a manner that they will move longitudinally with the bar but are free to move transversely thereof with the tool slides. In the preferred form, a series of spaced guide plates 88 are bolted to the underside of the bar 85 in position to define transverse grooves or guideways for the cam blocks 59.

The upper end of the bar 85 is rigid with a rod extension 89 which extends slidably through a bracket 90 on the front of the tailstock housing 24. Suitably spaced stop nuts 91 and 92 are adjustably threaded on the rod 89 in position respectively for alternate engagement with opposite sides of the bracket 90 to actuate the cam blocks 59. Thus, when the toolhead 36 reaches the end of the cutting stroke, the upper nuts 92 will engage the bracket 90 so that a slight continued movement of the head will cause the bar 85 to shift the cam blocks 59 relatively in an upward direction to effect tool clearance. When the toolhead 36 reaches the end of the return stroke, the lower nuts 91 will engage the bracket 90 so that a slight continued movement of the head will cause the bar 85 to shift the cam blocks 59 relatively in a downward direction whereby to project the tools again into normal cutting position.

Two longitudinally spaced recesses 93 defining the two positions of adjustment of the bar 85 are formed in the lowermost plate 88, and are adapted for selective engagement with a spring pressed detent 94 mounted in one wall of the guide structure 43.

The tool head 37 is arranged in the present instance to turn the end faces of the workpiece. The head comprises a base slide 95 mounted for vertical adjustment on the lower end of the contiguous guideway 25 on the front of the column 2. Since the tools are required to move transversely of the workpiece, the base slide 95 is not in this instance actuated during the cutting operation but instead is clamped in proper position as determined by the requirements of the work.

Figure 6:
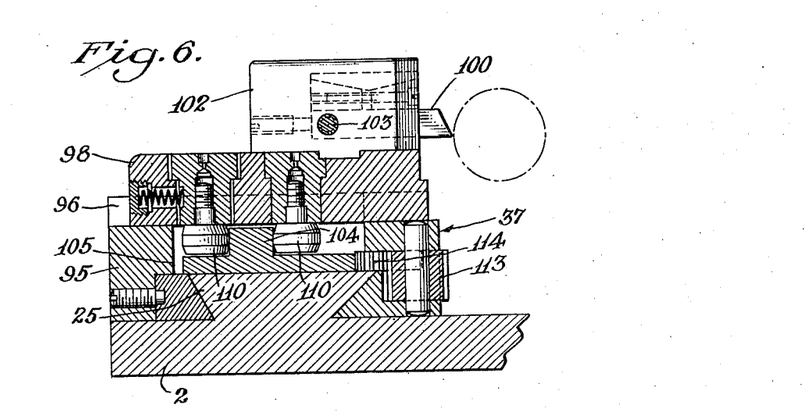
Fig. 6 is a horizontal sectional view through another of the tool supports taken along line 6—6 of Fig. 3.
Figure 7:
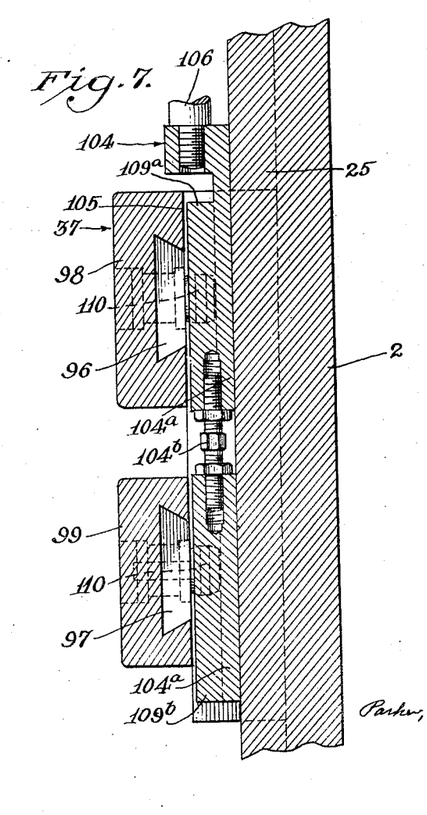
Fig. 7 is a vertical sectional view taken along line 7—7 of Fig. 3.

The base slide 95 is formed with two spaced transverse guideways 96 and 97. Two tool slides 98 and 99 are mounted for independent transverse movement in the guideways 96 and 97 and carry tools 100 and 101, respectively, for turning the opposite end faces of the workpiece. Each tool is mounted in a holder 102 which is adjustable by means of a screw 103 on the associated slide in a direction longitudinal of the workpiece. As a result, the tools 100 and 101 may be properly spaced and brought into alinement with the end faces of the work to be turned.

An elongated actuating cam member 104 extends longitudinally through a guideway 105 in the underside of the base slide 95. Preferably, the cam member 104 comprises two rectangular plates or slides 104a, the upper one of which is connected through a piston rod 106 to a piston 107 reciprocable in a hydraulic cylinder 108 mounted on the front of the column 2 near the top. These plates are connected by a screw 104b whereby they may be relatively adjusted toward and from each other. The cam plates 104a are formed on their front faces with cam ribs 109a and 109b. Spaced rollers 110 mounted on each of the tool slides 98 and 99 engage opposite sides of the cam ribs. These ribs are inclined intermediate their ends so as to actuate the slides 98 and 99 independently toward and from the workpiece upon downward and upward movement of the member 104.

To insure positive synchronized cutting translation of the various tools of the two tool heads 36 and 37, the base slide 38 and the cam member 104 are interconnected through suitable gearing. In the present instance, this gearing consists of a longitudinal gear rack 111 formed in the forward vertical edge of the base slide 38 which meshes with a pinion 112 removably mounted on the column 2. The pinion in turn is connected through an idler pinion 113 to a pinion 114 meshing with a longitudinal gear rack 115 formed in the forward longitudinal edge of the cam plate 104. Both pinions 113 and 114 are mounted on the base slide 95 of the toolhead 37. When it is desired to change the vertical relationship between the base slide 38 and the cam plate 104, it is merely necessary temporarily to remove the central pinion 112.

It will be seen that we have provided a new and improved turning machine which has a high rate of production. All of the tools operate simultaneously on the workpiece and each performs an allotted portion of the turning operation. By the use of interchangeable control and actuating cams of different configurations, the character of movement of each tool can be independently adjusted. In the present embodiment of the invention cylindrical and end face turning of the workpiece is illustrated, but it is to be understood that the peripheral cutting tools may be caused to turn various shapes and forms by the selective use of a control cam or template of appropriate shape.

We claim as our invention:

1. In a turning machine, in combination, means for supporting and rotatably driving a workpiece about a predetermined axis, a support mounted for translation in a cutting stroke and a return stroke longitudinally of said axis, a plurality of tool slides mounted on said support for independent movement transversely of said axis, and means automatically operable toward the end of said cutting stroke to retract said slides in a direction from said axis and to maintain said slides in retracted position during a portion of said return stroke for tool clearance.

2. In a turning machine, in combination, means for supporting and rotatably driving a workpiece about a predetermined axis, a support mounted for translation in a cutting stroke and a return stroke longitudinally of said axis, a plurality of tool slides mounted on said support for independent movement transversely of said axis, stationary cam means coacting with said slides positively to control the positions of said slides on said support in the course of movement of said support, and means automatically operable independently of said cam means substantially at the end of said cutting stroke to retract said slides in a direction from said axis, and substantially at the end of said return stroke to project said slides toward said axis.

3. In a turning machine, in combination, a frame, means on said frame for supporting a workpiece for rotation on a fixed axis, a tool support mounted on said frame for rectilinear translation in a direction parallel to said axis, a guide housing on said support and providing a plurality of parallel guideways extending perpendicularly to said axis, a plurality of tool slides mounted for reciprocation respectively in said guideways and adapted to support tools for cutting engagement with the workpiece, a plurality of actuating slides mounted in superimposed relation respectively on said tool slides within said guideways, means for adjustably connecting each tool slide and associated actuating slide for joint translation, and means for adjusting each tool slide relative to the associated actuating slide independently of said last mentioned means.

4. In a turning machine, in combination, a frame, means on said frame for supporting a workpiece for rotation on a fixed axis, a tool support mounted on said frame for rectilinear translation in a direction parallel to said axis, a guide housing on said support and providing a plurality of parallel guideways extending perpendicularly to said axis, a plurality of tool slides mounted for reciprocation respectively in said guideways and adapted to support tools for cutting engagement with the workpiece, a plurality of actuating slides mounted in superimposed relation respectively on said tool slides within said guideways, cam blocks mounted respectively in said tool slides for movement transversely thereof and having staggered cam serrations along opposite edges thereof for coacting engagement with complemental serrations in said slides whereby to retract said slides from said axis upon movement of said blocks into one position and to project said slides toward said axis upon movement of said blocks into another position, means for adjustably connecting said blocks respectively to sad actuating slides for joint translation along said guideways, and a single push and pull member interfitting with said blocks to permit movement of said blocks with said tool slides, and operable to shift said blocks alternately into said two positions respectively upon movement of said support into its opposite end positions.

5. In a turning machine, in combination, a frame, means on said frame for supporting a workpiece for rotation on a fixed axis, a tool support mounted on said frame for rectilinear translation in a direction parallel to said axis, a guide housing on said support and providing a plurality of parallel guideways extending perpendicularly to said axis, a plurality of tool slides mounted for reciprocation respectively in said guideways and adapted to support tools for cutting engagement with the workpiece, a plurality of actuating slides mounted in superimposed relation respectively on said tool slides within said guideways, cam blocks mounted respectively in said tool slides for movement transversely thereof and having staggered cam serrations along opposite edges thereof for coacting engagement with complemental serrations in said slides whereby to retract said slides from said axis upon movement of said blocks into one position and to project said slides toward said axis upon movement of said blocks into another position, means for adjustably connecting said blocks respectively to said actuating slides for joint translation along said guideways, and a stationary elongated cam member having separate longitudinal portions of individual configurations slidably interlocked with said actuating slides for controlling the position of said actuating slides on said support in the course of movement of said support.

6. In a turning machine, in combination, a frame, means on said frame for supporting a workpiece for rotation on a fixed axis, a tool support mounted on said frame for rectilinear translation in a direction parallel to said axis, a guide housing on said support and providing a plurality of parallel guideways extending perpendicularly to said axis, a plurality of tool slides mounted for reciprocation respectively in said guideways and adapted to support tools for cutting engagement with the workpiece, a plurality of actuating slides mounted in superimposed relation respectively on said tool slides within said guideways, means for adjustably connecting each tool slide and associated actuating slide for joint translation, and an elongated cam bar removably mounted on said frame and having individual longitudinally spaced cam areas, and follower means on said actuating slides coacting respectively with said cam areas to control the operation of said slides in response to the translation of said support.

7. In a turning machine, in combination, means for supporting and rotatably driving a workpiece about a predetermined axis, a support mounted for translation in a cutting stroke and a return stroke longitudinally of said axis, two parallel tool slides mounted on said support for movement therewith and for movement thereon transversely of said axis, one slide carrying a single tool and the other slide carrying two spaced tools, means for automatically controlling the position of said slides on said support in response to the movement of said support, and additional means for automatically adjusting said tool slides relatively to said first mentioned means whereby to locate said tools in cutting relationship to the workpiece during said cutting stroke and in free spaced relationship to the workpiece during said return stroke.

8. In a turning machine, in combination, a frame, means on said frame for supporting a workpiece for rotation about a predetermined axis, a base slide mounted on said frame for adjustment along said axis, a plurality of tool slides mounted on said base slide for reciprocation transversely of said axis, a tool holder mounted on each tool slide for adjustment longitudinally of said axis, a cam member mounted on said base slide for translation longitudinally of said axis and having a series of inclined cam areas, and means on said tool slides for coacting respectively with said cam areas, whereby to effect actuation of said tool slides in response to translation of said cam member.

9. In a turning machine, in combination, a frame, means on said frame for supporting a workpiece for rotation about a predetermined axis, a base slide mounted on said frame for adjustment along said axis, a plurality of tool slides mounted on said base slide for independent reciprocation thereon transversely of said axis, a single cam member mounted for translation on said base slide longitudinally of said axis, and follower means on said tool slides coacting with said cam member to control the movement of said tool slides in accordance with the translation of said cam member.

10. In a turning machine, in combination, a frame, means on said frame for supporting a workpiece for rotation about a predetermined axis, a base slide mounted on said frame for adjustment along said axis, a plurality of tool slides mounted on said base slide for reciprocation transversely of said axis, a cam plate mounted for reciprocation longitudinally of said axis and having a plurality of cam sections relatively adjustable toward and from each other longitudinally of said axis, rollers on said tool slides coacting respectively with said cam secttions, and a hydraulic actuator for reciprocating said cam plate.

11. In a turning machine, in combination, a frame, means on said frame for supporting a workpiece for rotation about an axis, two tool slides mounted on said frame for movement transversely of said axis at one side thereof, a cam member reciprocable on said frame longitudinally of said axis for actuating said slides, a toolhead mounted on said frame at the opposite side of said axis and having an actuating member movable longitudinally of said axis, fluid pressure means for independently moving said members, and mechanical interlock means for constraining said members to move in synchronism.

12. In a turning machine, in combination, a frame, means on said frame for supporting a workpiece for rotation about an axis, two tool slides mounted on said frame for movement transversely of said axis at one side thereof, a cam member reciprocable on said frame longitudinally of said axis for actuating said slides, a toolhead mounted on said frame at the opposite side of said axis and having an actuating member movable longitudinally of said axis, fluid pressure means for independently moving said members, a central removable pinion mounted on said frame, a longitudinal gear rack on said cam member, a smaller pinion meshing with said rack, an idler pinion operatively connecting said pinions, and a longitudinal gear rack on said actuating member and meshing with said central pinion.

13. In a turning machine, in combination, a frame, means on said frame for supporting a workpiece for rotation about an axis, a base slide mounted on said frame for movement longitudinally of said axis, a tool slide mounted on said base slide for movement transversely of said axis and having a notch extending crosswise of its movement, serrations formed along opposite sides of said notch, a cam block slidable in said notch and formed along opposite sides with serrations adapted to coact with said first mentioned serrations, the coacting sets of serrations at opposite sides of said notch being staggered whereby to project said slide toward said axis upon movement of said block into one position along said notch and to retract said slide from said axis upon movement of said block into another position along said notch, said serrations acting to positively interlock said slide and said block against relative movement transversely of said axis in either position of said slot, a second tool slide mounted on said base slide for movement transversely of said axis, and means for actuating said block and said second slide transversely of said axis in response to movement of said base slide.

CURTIS T. DARE.
GORDON F. ESSON.